Edmond Henry-Biabaud
INVENTOR.

United States Patent Office 3,444,852
Patented May 20, 1969

3,444,852
INTERNAL-COMBUSTION ENGINE
Edmond Henry-Biabaud, Paris, France, assignor to Société Anonyme André Citroen, Paris, France, a corporation of France
Filed Feb. 16, 1967, Ser. No. 616,702
Claims priority, application France, Feb. 17, 1966, 49,923
Int. Cl. F01l 3/06
U.S. Cl. 123—188                      10 Claims

ABSTRACT OF THE DISCLOSURE

A cylinder head of an internal-combustion engine has an intake port of circular cross-section with an axis inclined at an acute angle to the cylinder axis and a venturi defined by an annular insert received in this port to form a seat for a control valve; an inlet passage disposed in a plane perpendicular to the cylinder axis terminates in a portion of elliptical cross-section substantially conforming to the elliptical projection of the inlet port upon a plane transverse to the axis of this terminal portion, the latter being connected to the port by way of a transition zone of elliptical or oval cross-section.

---

In an internal-combustion engine of a touring or utilitarian type of vehicle, it is desirable that the permeability of the inlet passage be high and that the combustion gases admitted into the chamber be given a substantial rotary movement about the axis of the cylinder. However, these conditions are, in general, contradictory. In actual fact the movement of the gas transverse to the inlet passage is caused by the effect of the pressure difference existing between the interior of the cylinder and the inlet nozzle; this pressure difference has the effect of imparting to gaseous mixtures, on the one hand, a kinetic energy of translation and, on the other hand, a swirling energy, in such a manner as to increase the forward speed of the mixture, and thereby the induction process, to the detriment of the rotational speed component.

In an internal-combustion engine comprising a cylinder with an inlet passage for the fuel mixture and a valve for closing same, I provide in accordance with this invention a venturi forming the termination of the inlet passage which, upstream of the venturi, has a substantially elliptical cross-section with the major axis thereof substantially equal to the inlet diameter of the venturi.

An embodiment of an internal-combustion engine in accordance with the present invention will now be described, by way of example, with reference to the accompanying diagrammatic drawing in which.

Figure 1:
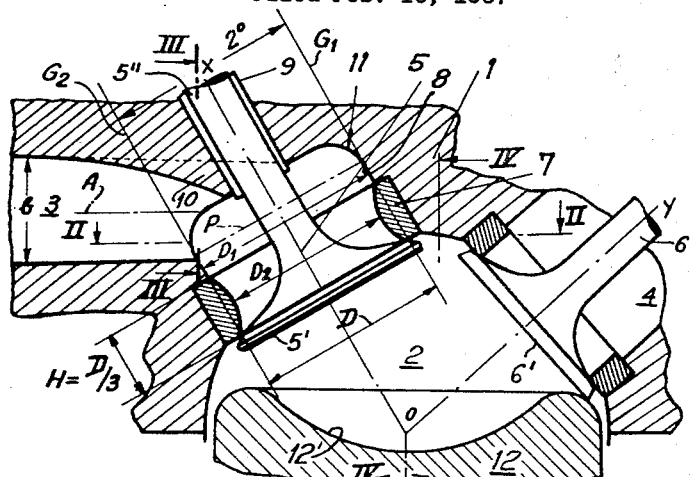
FIG. 1 is a fragmentary sectional view of a cylinder head of an engine according to my invention.
Figure 2:
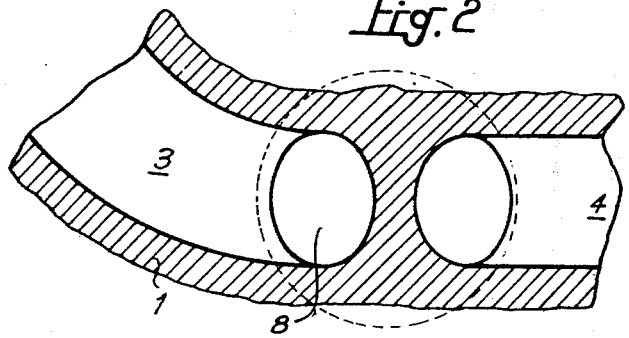
FIG. 2 is a cross-sectional view taken on the line II—II of FIG. 1 but drawn to a smaller scale, showing the shape of the inlet and exhaust passages of the cylinder head in a plane normal to the cylinder axis.

In the drawing I have shown a hemispherical cylinder head 1 having a center 0, at the top of a cylinder 2 forming part of an internal-combustion engine not farther illustrated. The cylinder head includes an inlet passage 3 and an exhaust passage 4 having a corresponding inlet valve 5 and exhaust valve 6 with valve heads 5' and 6' respectively. The axis OX of the inlet valve 5 and the axis OY of the exhaust valve 6 pass through the center O, each of these axes being inclined at an acute angle to the cylinder axis 02.

The inlet passage 3 lies substantially in a plane which here is perpendicular to the axis OZ but could also be inclined with respect to this axis. The inlet passage terminates in a portion 3' upstream of a venturi defined by an annular member 7 of convex inner peripheral surface, inserted in an inlet port 8 of the cylinder head 1, which forms a seat for the valve 5. The entry diameter D1 of the venturi is substantially equal to the diameter D of the seat for the valve 5; the diameter D2 of its throat is approximately 0.8 to 0.9D so that the cross-sectional area of the constriction at the throat is equal to about three quarters of the area of the seat of the valve 5. The height or axial length H of the member 7 is about equal to ⅓ D. Finally, the venturi is asymmetric, the two converging zones on each side upstream and downstream of the throat being defined in longitudinal section by two blending circular arcs of different radii, the zone of smaller radius being situated adjacent the valve head 5'.

As shown, the axis A of the passage 3 in the region of the valve 5, the axis OX of this valve and the axis OY of the exhaust valve 6 are in the same plane i.e. in the plane of FIG. 1; and fresh gas arriving through the passage 3 thus cools the valve head 6'.

Figure 3:
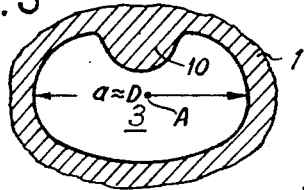
FIG. 3 is a cross-sectional view taken on the line III—III of FIG. 1.

The intake port 8 receiving the insert 7 is cylindrical. Its section in a plane P normal to the axis OX is circular; when projected upon the plane III—III parallel to the cylinder axis OZ and perpendicular to the terminal portion 3' of passage 3, this section becomes elliptical, thus substantially conforming to the elliptical outline of the terminal portion 3' as seen in FIG. 3. This elliptically profiled terminal portion, having a minor axis $b$ and a major axis $a$ substantially equal to D, is joined to port 8 by a transition zone 11 whose cross-section is preferably also an ellipse but can be oval to simplify machining. In order to enable manufacture of the cylinder head with metal cores, this transition zone my be given a slight draft; thus, the angle of convergence of the two sets of generatrices $G_1$, $G_2$ of zone 11 in an axial plane of the passage 3 is, preferably, at least 2°. Zone 11 could also be machined with the aid of a milling cutter.

Furthermore, the cylinder head 1 has a bore 9 forming a guide for the stem 5" of valve 5. For improved guidance, the terminal inlet portion 3' is formed with an internal rib 10 overhanging the insert 7 near the end of bore 9.

Figure 4:
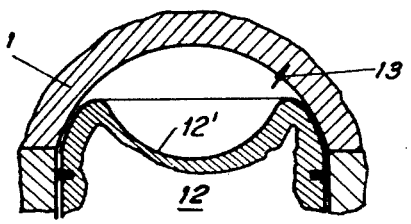
FIG. 4 is a cross-sectional view of an associated piston taken on the line IV—IV of FIG. 1.
Figure 5:
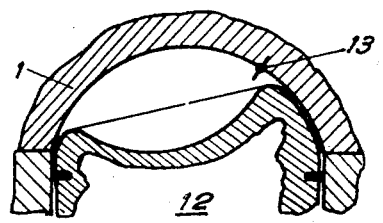
FIG. 5 shows a modification of the piston of FIG. 4.

The crown of the piston 12, which is mounted in the cylinder 2, has a spherically shaped recess 12' confronting the port 8. This spherical recess can have its center on the axis OZ, as shown in FIGS. 1 and 4, or be eccentric with respect to this axis (FIG. 5).

The ignition point 13 of an associated spark plug is positioned substantially at the level of the proximal edge in its upper-dead center position (FIG. 1). The axis of the spark plug is trained into the recess 12' which, in the position of FIG. 1, surrounds the center of curvature O of the concavity of cylinder head 1, i.e. the intersection of cylinder axis OZ, intake-port axis OX and exhaust-port axis OY.

I claim:

1. In an internal-combustion engine having a piston cylinder with a cylinder head containing an inlet passage for a fuel mixture and a valve for controlling the admission of the fuel mixture into said cylinder through said passage, the improvement wherein said cylinder head has an intake port for said fuel mixture forming a seat for said valve, said port being of circular cross-section and having an axis inclined at an acute angle to the cylinder axis, said passage lying in a plane transverse to said cylinder axis and having a terminal portion upstream of said port with an axis coplanar with said inclined axis and said cylinder axis, said terminal portion having an elliptical cross-section which conforms substantially to the projection of said circular cross-section upon a plane perpendicular to said coplanar axis and whose major axis substantially equals the diameter of said circular cross-section.

2. The improvement defined in claim 1 wherein said cylinder head inlet passage is formed with a transition zone of generally elliptical cross-section between said terminal portion and said port.

3. The improvement defined in claim 2 wherein said transition zone has a slight draft with an angle of divergence of at least 2° between opposite generatrices.

4. The improvement defined in claim 1, further comprising an annular insert in said port having a convex inner peripheral surface, thereby forming a venturi with a constricted throat portion.

5. The improvement defined in claim 1 wherein said valve is provided with a stem, said cylinder head having a guide bore for said stem opening toward said port substantially at the end of said terminal portion, the latter being formed with an internal rib at the end of said bore providing added guidance for said stem.

6. The improvement defined in claim 1 wherein said cylinder head is substantially hemispherically concave with a center of curvature at the intersection of said inclined axis and said cylinder axis.

7. The improvement defined in claim 6, further comprising a piston in said cylinder having a spherically curved recess confronting said port.

8. The improvement defined in claim 7, further comprising igniter means in said cylinder head with an ignition point adjacent the edge of said recess in an upper-dead-center position of said piston proximal to said point.

9. The improvement defined in claim 8 wherein said center of curvature is located within said recess in said upper-dead-center position.

10. The improvement defined in claim 6 wherein said cylinder head is provided with an exhaust port having an axis passing through said center at an acute angle to said cylinder axis.

References Cited

UNITED STATES PATENTS

| 3,020,899 | 2/1962 | Mueller. |
| 3,335,707 | 8/1967 | Heinrich. |

FOREIGN PATENTS

| 348,719 | 5/1931 | Great Britain. |
| 1,015,555 | 1/1966 | Great Britain. |

WENDELL E. BURNS, *Primary Examiner.*

U.S. Cl. X.R.

123—191